(12) United States Patent
Tanaka et al.

(10) Patent No.: US 7,016,590 B2
(45) Date of Patent: Mar. 21, 2006

(54) WIRING DEVICE FOR OPTICAL FIBER

(75) Inventors: Satoru Tanaka, Tsu (JP); Masaru Yoshida, Tsu (JP); Yasuichi Kinekawa, Kadoma (JP); Yoshihiro Shogaki, Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/060,276

(22) Filed: Feb. 18, 2005

(65) Prior Publication Data
US 2005/0213920 A1    Sep. 29, 2005

(30) Foreign Application Priority Data
Feb. 20, 2004    (JP)    ............................. 2004-045298

(51) Int. Cl.
G02B 6/00    (2006.01)
(52) U.S. Cl. ...................... 385/135; 385/137; 385/138; 385/139
(58) Field of Classification Search ..................... None
See application file for complete search history.

(56) References Cited
FOREIGN PATENT DOCUMENTS
JP        2793183        6/1998

OTHER PUBLICATIONS
English Language Abstract of JP 2793183.
U.S. Appl. No. 11/060,284 to Tanaka et al., which was filed on Feb. 18, 2005.

Primary Examiner—Frank G. Font
Assistant Examiner—Michael P. Mooney
(74) Attorney, Agent, or Firm—Greenblum & Bernstein, P.L.C.

(57) ABSTRACT

There is provided wiring device for optical fiber capable of increasing the performance of connection work of an optical fiber cable without deteriorating a signal transmitting properties of the optical fiber cable. The wiring device comprise a plug receptacle main body which is mounted on a mounting opening opened in the outer surface of a building, a receptacle being provided to the plug receptacle main body and having a plug connection hole facing an outside of the plug receptacle main body, a winder including a winding body which has an outer circumferential surface of radius of curvature larger than the permitted minimum radius of curvature of an optical fiber cable wired to the inside of a building and connected to the receptacle and on which a core wire of the optical fiber cable is wound, and a retainer being provided on the plug receptacle main body to maintain the winder inner side of a building, in which the receptacle for optical fiber and the winder are arranged in parallel with each other in the front-back direction, and pressing pieces are formed integrally with the winder and the retainer for contacting the bent portion of the core wires to prevent the bent portion from being expanded.

6 Claims, 10 Drawing Sheets

WIRING DEVICE FOR OPTICAL FIBER

BACKGROUND OF THE INVENTION (a) Field of the Invention

The present invention relates to a wiring device for optical fiber, which uses an optical plug receptacle for connecting an optical fiber cable introduced inside the wall or under the floor of a building.

(b) Description of the Related Art

Conventionally, a wiring device for optical fiber in which an optical fiber cable wired inside a building is introduced into a flush box laid in the wall surface of the building and an optical plug receptacle being attached to a flush box using a mounting frame standardized based on a flush type wiring device is used is disclosed (for example, see Japanese Examined Patent Application Publication No. 2,793,183).

In the aforementioned wiring device in which an optical plug receptacle is attached to a flush box laid in the wall surface, in order to receive a remaining length portion of the optical fiber cable being introduced into the empty space of the flush box, the remaining length portion of the optical fiber cable is bent. However, when the optical fiber cable is bent in a radius of curvature smaller than a permitted minimum radius of curvature, the transmitting loss increases or the reliability of a signal transmission decreases. As a result, there are problems in that it is need to manage the radius of curvature of the optical fiber cable to the permitted minimum radius of curvature or more, the treating of the remaining length portion of the optical fiber cable becomes troublesome, and the workability becomes deteriorated. Further, in case that the optical fiber cable is pushed into the flush box in a state in which the remaining length portion is bent at the time of working, the optical fiber cable is apt to expand due to the elastic force returning to original expanded state thereof or to be caught to foreign substances in the flush box. As a result, it is difficult to reliably protect the optical fiber cable.

SUMMARY OF THE INVENTION

The present invention is contrived to solve the above problems, and it is an object of the present invention to provide a wiring device for optical fiber capable of improving the performance of connection work of optical fiber cable without deteriorating a signal transmitting properties.

In a first aspect of the present invention, there is provided a wiring device for optical fiber, the wiring device comprise: an optical plug receptacle including a plug receptacle main body which is mounted on a mounting opening opened in the outer surface of a building and a receptacle for optical fiber which is provided to the plug receptacle main body and has a plug connection hole facing the outside of the plug receptacle main body; a winder which fixes an optical fiber cable wired to the inside of a building and connected to the receptacle for optical fiber and on which the optical fiber cable is wound at a radius of curvature larger than the permitted minimum radius of curvature; and a retainer being provided on the plug receptacle main body to retain the winder in the inner side of the building, wherein the receptacle for optical fiber and the winder are arranged in parallel with each other in the front-back direction so that the core wire of the optical fiber cable is bent between the receptacle for optical fiber and the winder, are provided with expansion-preventing portions being in contact with the bent portion of the core wires so as to prevent that the bent portion is expanded in a direction away from the receptacle for optical fiber and the winder.

In a second aspect according to the first aspect of the invention, wherein the winder includes a clad retaining portion for retaining a clad portion of the optical fiber cable, which the clad retaining portion is provided at a part of the winder on the receptacle's side, and a winding portion for winding cores of the optical fiber cable, which the winding portion is provided at a part of the winder opposite from the receptacle with respect to the clad retaining portion.

In a third aspect according to the first or second aspect of the invention, wherein the winder is provided with a knob, and the retainer includes a receiving portion and a guiding portion, which the receiving portion is formed of the shape of substantially a box which one side is opened so as to receive the winder being inserted from the one side to the inside thereof, and which the guiding portion is formed on the inner surface of the receiving portion to guide the winder in combination with the knob at the time of receiving the winder.

In a fourth aspect according to the first or second aspect of the invention, wherein the retainer includes a receiving portion and a receiving space, which the receiving portion is formed of the shape of substantially a box which one side is opened so as to receive the winder being inserted from the one side of the box to the inside thereof, and which the receiving space is formed between the bottom surface opposite from the one side of the box and the winder so as to receive the core wire of the optical fiber cable.

BRIEF DESCRIPTION OF THE DRAWINGS

The above and other features and advantages of the present invention will become more apparent by describing in detail exemplary embodiments thereof with reference to the attached drawings in which:

FIGS. 3A to 3C are views illustrating a receiving state of the wiring device for optical fiber according to an embodiment of the present invention, in which FIG. 3A is a front view, FIG. 3B is a side view, and FIG. 3C is a bottom view;

FIGS. 7A to 7C are views illustrating a projected state of the wiring device for optical fiber according to an embodiment of the present invention, in which FIG. 7A is a front view, FIG. 7B is a sectional view taken along a line B—B, and FIG. 7C is a sectional view taken along a line C—C;

FIGS. 8A and 8B are views illustrating the wiring device for optical fiber according to an embodiment of the present invention, in which FIG. 8A is a sectional view of a state in which the winder is not received, and FIG. 8B is a sectional view of a state in which the winder is received.

FIGS. 9A and 9B are sectional views illustrating a used state of the wiring device for optical fiber, in which FIG. 9A is a sectional view related to an embodiment of the present invention, and FIG. 9B is a sectional view related to a reference example; and FIGS. 10A and 10B are sectional views illustrating a used state of wiring device for an optical fiber, in which FIG. 10A is a sectional view related to an embodiment of the present invention, and FIG. 10B is a sectional view related to a reference example.

DETAILED DESCRIPTION OF THE EMBODIMENTS

Hereinafter, embodiments of the present invention will be described in detail with reference to the FIGS. 1 to 10 such that the embodiments can be easily put into practice by those skilled in the art. However, since the present invention can be embodied in various forms, the present invention is not limited to the embodiments described below.

Further, in the detailed description of the present invention to be described below, if it is not specifically mentioned, in case that the left, right, top and bottom directions are prescribed, the front face of FIG. 3A becomes the front side. Therefore, the right edge of FIG. 3B becomes the rear end.

Figure 1:
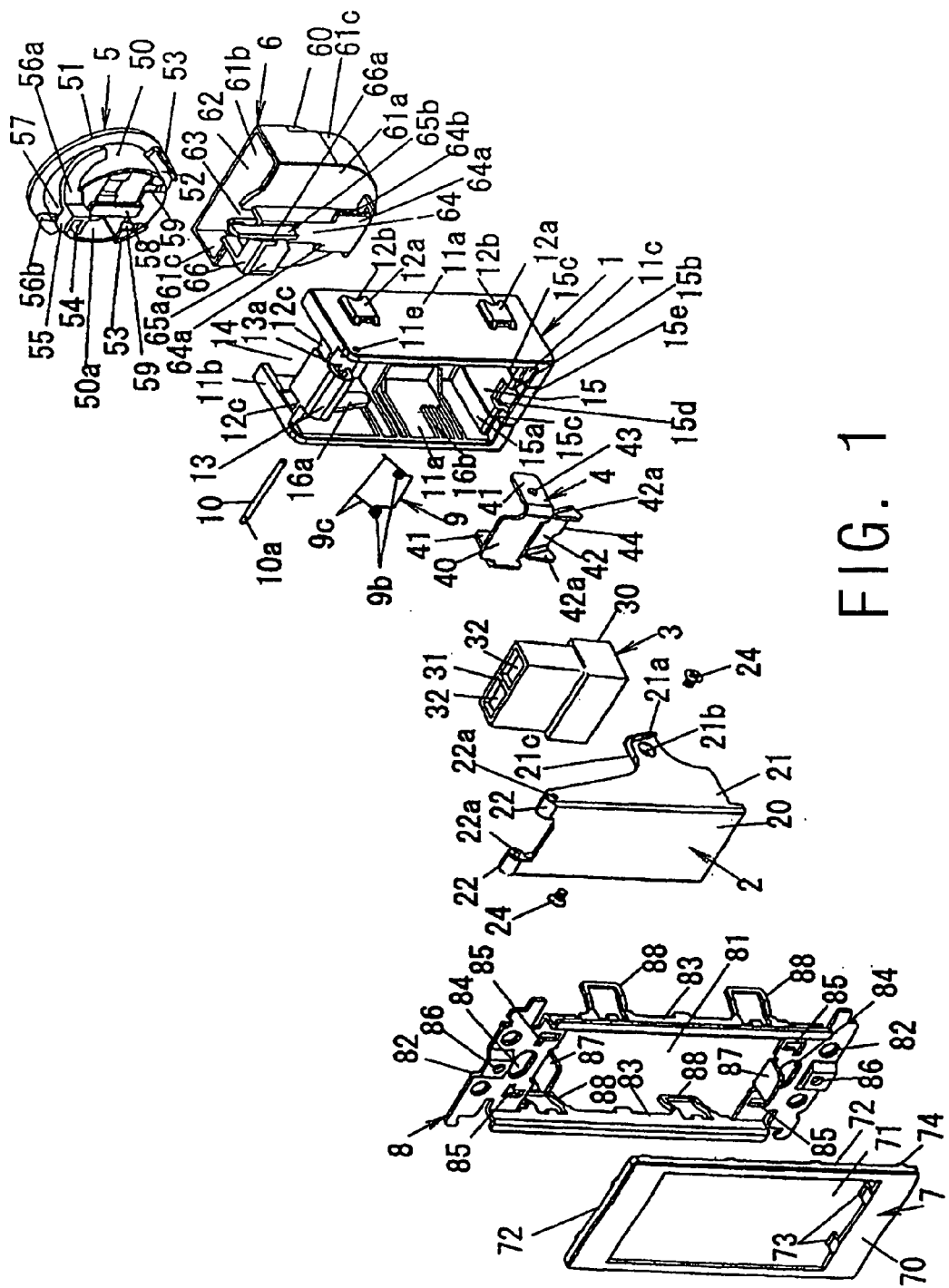
FIG. 1 is an exploded perspective view illustrating a wiring device for optical fiber according to an embodiment of the present invention as seen from a front side.
Figure 2:
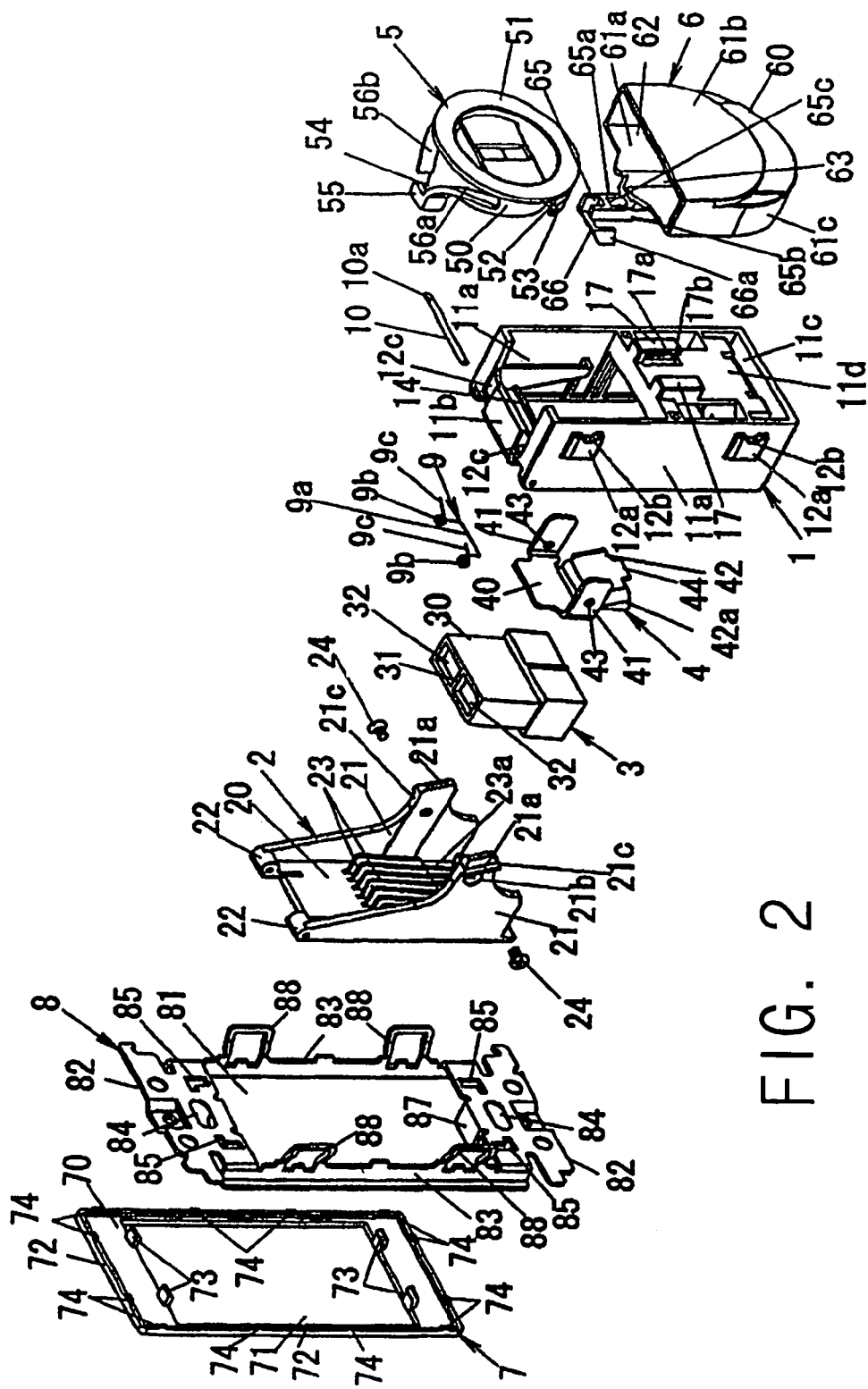
FIG. 2 is an exploded perspective view illustrating a wiring device for optical fiber according to an embodiment of the present invention as seen from a rear side.
Figure 3:
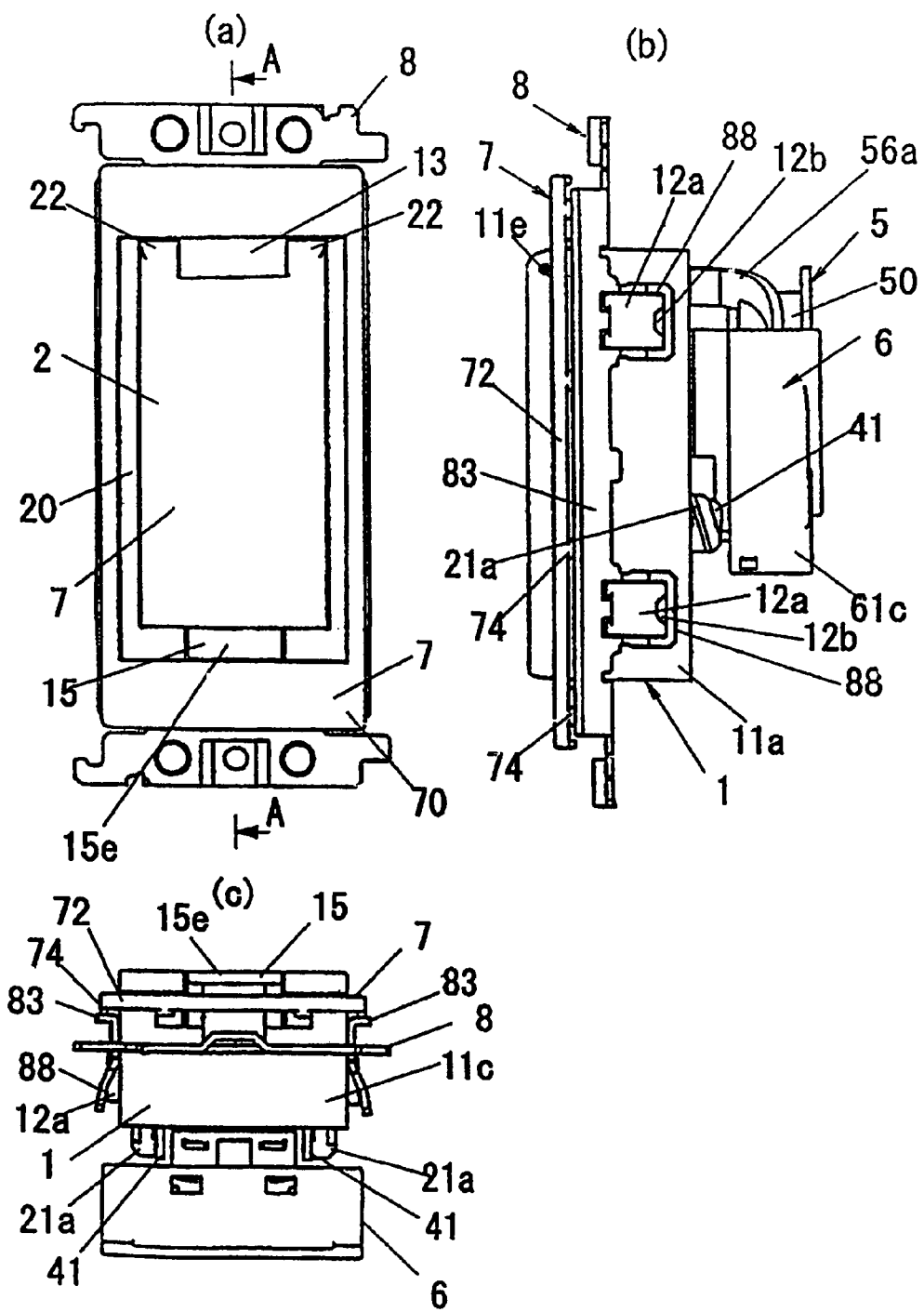
Figure 4:
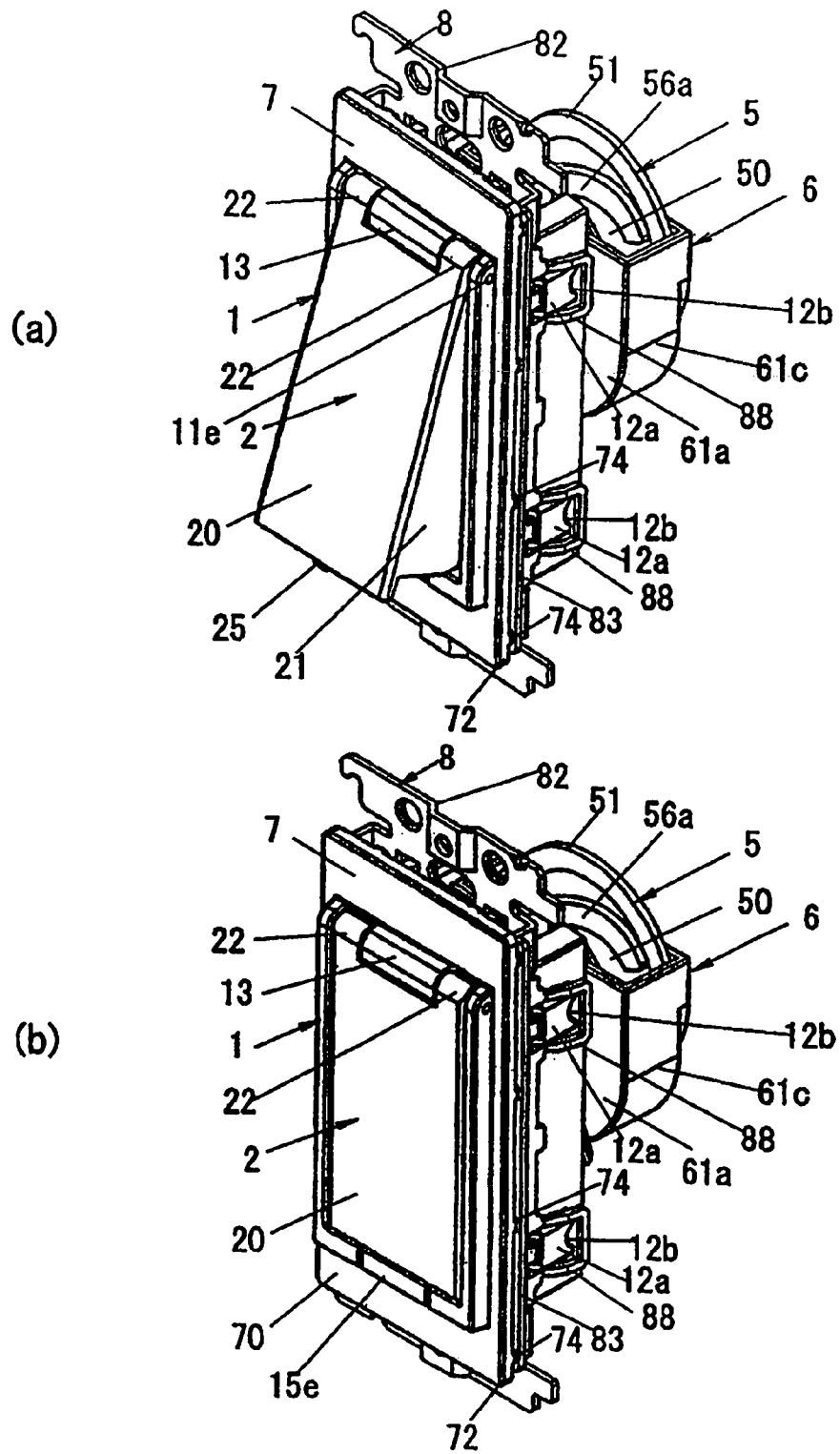
FIGS. 4A and 4B are an external perspective views illustrating the wiring device for optical fiber according to an embodiment of the present invention as seen from a front side.

As shown FIGS. 1 to 3, a wiring device according to an embodiment of the present invention comprises an window-opening 81 having the same dimensions as a mounting frame to which three wiring devices being each one module in the shape of the big square standardized in JIS (Japanese Industrial Standard) is attached, a metallic mounting frame 8 being fixed into an mounting opening which is opened at an outer surface of a building, a plug receptacle main body 1, which is able to attach with respect to the mounting frame 8, having the dimensions of three modules, a cover 2 which is rotatably supported so as to open and close an opening formed at the front surface of the plug receptacle main body 1, a receptacle 3 for optical fiber (hereinafter, abbreviated as a receptacle) being attached to the rear surface side of the cover 2, a pressing plate 4 fixing the receptacle 3 to the cover 2, a winder 5 winding an optical fiber cable 100 to which an optical fiber plug being connected to the receptacle 3 is attached, a retainer 6 being attached to the plug receptacle main body 1 and retaining the winder 5 in inner side a building, and a decoration cover 7 being attached to the front side of the plug receptacle main body 1.

In the plug receptacle main body 1, four sides in the left, right, top, and bottom directions thereof are surrounded by the side walls 11a, 11a, 11b and 11c, the nearly half of the upper portion thereof is opened in the forward and backward directions, and the nearly half of the lower portion thereof is made of a synthetic-resin molded body with the rear part lid integrally formed. Further, on the rear-side outer surfaces of the left and right side walls 11a, two hooking protrusions 12a being hooked to a hooking frame piece 88 of the mounting frame 8 to be described below protrude from the both upper and lower sides, respectively, and on front-side outer surfaces of the top and bottom side walls 11b and 11c, two hooking recesses 12c to which elastic hooking pieces 73 of a decoration cover 7 to be described below are hooked are formed at both left and right sides, respectively. Further, on the front-side portion of the topside wall 11b, a bearing portion 13 for rotatably supporting the cover 2 is formed, and on the rear-side portion of the topside wall 11b, a notch 14 into which an optical fiber plug being connected to the receptacle 3 is inserted is formed.

Further, a cross piece of a protrusion piece 15a having an 'L' shaped section to be erected from the lower-side edge of the rear part lid toward the front side is connected to the front-side edge of the lower side wall 11c. A stepped portion 15b is formed on the front portion of the protrusion piece 15a, in which the front portion of the protruding piece 15a is lower than the rear portion of the protruding piece 15a by one step due to the stepped portion 15b. Further, on both left and right sides of the protruding piece 15a, two slits 15c opened toward the front-end side are formed in the front-rear direction to the rear part 11d. A flexible piece 15 is inserted into the slits 15c, 15c such that the rear edge thereof is connected to the rear part lid and the front edge thereof is flexible to the thickness direction (vertical direction). Further, a hooking hole 15d is formed in the front-side portion of the flexible piece 15 so as to penetrate the flexible piece 15 in the thickness direction along the stepped portion 15b and to hook to/be detached from a hooking protrusion piece 25 protruding to a center of the lower end portion of the cover 2 or a hooking protrusion piece 44 protruding to a center of a lower end of the pressing plate 4.

Further, ribs 16a are formed on inner side surfaces of the left and right side walls 11a, 11a from connection portions between the top side wall 11b and the left and right side walls 11a to nearly center portions in a vertical direction so as to contact the rear edges of both side portions of the cover 2 at the time of receiving the cover 2, and each rib 16a has an inclined surface which backwardly retracts from the top portion to the bottom portion thereof. Further, on each lower portion of inner side surfaces of the left and right side walls 11a, 11a, a plurality of ribs 16b protruding from the front edge of the side wall 11a toward the rear side is formed so as to engage with engaging claws 21 disposed at both side portions 21 of the cover 2 when the cover 2 is projected to the front side.

Further, supporting portions 17 for supporting a retainer 6 are integrally formed at both left and right sides on the upper-side rear surface of the rear part 11d at both left and right sides. Each supporting portion 17 has a supporting groove 17a whose side surface opposing each other and lower end is opened. The retainer 6 is detachably attached to the rear surface of the rear part lid by the supporting groove 17a.

As shown in FIGS. 1 and 2, the cover 2 is made of a synthetic-resin molded body in which the front part 20 having a rectangular shape, side parts 21,21 extending from both left and right sides of the rear surface of the front part 20 toward the rear direction and having a fan-like shape, leg pieces 21c, 21c protruding from the rear edges of the lower portion of the side parts 21,21 to the rear side and shaft supporting portions 22,22 formed on both sides of an upper end of the front portion 20 so as to upwardly protrude are integrally formed. The cover 2 constitutes a receiving unit for receiving and maintaining the receptacle 3 at a space between the rear surface of the front part 20 and each side part 21,21. The shaft supporting portions 22,22 has a cylindrical shape, the shaft direction thereof is approximately in parallel with a left-right direction, and shaft holes 22a into which both ends of a rotational shaft 10 are inserted are formed in the manner of penetration at each center portion of the shaft supporting portions 22. After a spring member 9 is received in a bearing recess 13a of the bearing portion 13 of the plug receptacle main body 1 and the bearing portion 13 of the plug receptacle main body 1 is interposed between the shaft supporting portions 22,22, the rotation shaft 10 is inserted into a shaft hole lie formed in the one side wall 11a of the plug receptacle main body 1, the shaft hole 22a of the one shaft supporting portion 22, the bearing recess 13a of the bearing portion 13, the shaft hole 22a of the other shaft supporting portion 22 and the shaft hole 11e of the other side wall 11a in this order, so that the upper end of the cover 2 is rotatably pivoted with respect to the plug receptacle main body 1. The spring member 9 always biases the lower end side of the cover 2 toward the front side. Further, a center portion of the spring member 9 is bent in a 'U' shape, and twisted portions 9b, 9b are formed at both ends of the spring member 9.

Further, a plurality of supporting ribs 23 contacting the front surface of a housing 30 of the receptacle 3 protrudes from the rear surface of the front part 20 in parallel with the side parts 21 between the side parts 21,21. Each supporting rib 23 is formed such that the protruded length thereof gradually increases as it goes to the upper side. Further, a stepped portion 23a is formed at the lower portion of each supporting rib 23 in conformity with the surface shape of the housing 30. Each engagement claw 21a, 21a engaging with the ribs 16b of the plug receptacle main body 1 outwardly protrudes from the rear ends of the leg pieces 21c, 21c of the cover 2. Each clearance hole 21b into which a screw 24 for fixing the pressing plate 4 is inserted is formed in the leg pieces 21c.

The housing 30 of the receptacle 3 is comprised of a hollow member being made of a synthetic-resin molded body and having a rectangular parallelepiped shape. In this housing 30, an outer circumference surface of a front portion (which is a lower part at the time of attaching it to the cover 2) side is protruded from an outer circumference surface of a rear portion (which is a upper part at the time of attaching it to the cover 2) side. Further, an inside space of the housing 30 is partitioned into a left and a right receiving chambers 32,32 by a partition wall 31. Here, the upper side portion of receiving chamber 32 becomes a first plug connection portion to which a first optical-fiber plug 103 being connected to an optical fiber cable which is wired to the inside of a building is connected, the lower side portion of receiving chamber 32 become a second plug connection portion to which a second optical-fiber plug (not shown) being inserted through a lower side hole (plug connection hole) of the housing from outer surface side of a building is connected, and a sleeve (not shown) for arranging and holding a ferrule of the optical fiber plug being connected to the first and second plug connection portions is disposed at an intermediate portion of each receiving chamber 32.

The pressing plate 4 is formed by processes of drawing and bending a metal plate. In the pressing plate 4, a contact piece 40 having a rectangular plate shape and contacting the rear surface of the housing 30 of the receptacle 3, supporting pieces 41,41 backwardly protruding from both the lower left and right edges of the contact piece 40, an inclined piece 42 downwardly protruding from the center of the lower side edge of the contact piece 40, and contact pieces 42a, 42a forwardly protruding from both the left and right edges of the inclined piece 42 are integrally formed. A tapped hole 43 into which the screw 24 is screwed is formed in an intermediate portion of each of supporting pieces 41, and the leading ends of the supporting pieces 41 extend to a position opposing the rear surface of the rear end of the leg piece 21c of the cover 2 (that is, the rear surface of the engagement claw 21a). Further, the hooking protrusion piece 44 being hooked into the hooking hole 15d of the flexible piece 15 downwardly protrudes from the center of the lower side edge of the inclined piece 42.

As shown in FIGS. 1 and 2, the winder 5 has a winding body 50 being made of a synthetic-resin molded body and having a flat cylindrical shape of which a length of shaft in smaller than a diameter thereof. On the outer circumferential surface of the winding body 50, a flange 51 protruding in the radial direction from the entire circumference of the rear end of the winding body 50 is integrally formed, and a flange 52 protruding in the radial direction from the lower-side portion of an intermediate portion of the front-back direction is integrally formed. Further, protrusion pieces 53,53 which are in parallel with the outer circumferential surface of the winding body 50 are formed integrally with the both left and right sides of the outer circumferential portion of the flange 52 toward the front side. A protrusion piece 54 forwardly protruding from the upper front edge of the winding body 50 is formed integrally therewith. The protrusion piece 54 is formed such that the width thereof along the peripheral direction decreases as it goes to the front side, and a pressing piece 55 which is bent in an 'L' shape to be paralleled with the protrusion piece 54 is formed integrally with one side edge of the front-side portion of protrusion piece 54 toward the outside. Further, drawing walls 56a and 56b protruding from the connection portion with the protrusion piece 54 toward the outer circumferential direction up to an intermediate position in the front-back direction are integrally formed on the upper-side of outer circumferential surface of the winding body 50, and each drawing walls 56a and 56b is curved in a circular arc shape such that the interval therebetween broadens out as it goes to the rear side. Further, the front end of the one drawing wall 56a is formed integrally with the pressing piece 55. A recess 50a, which is recessed in rectangular, is formed on the center portion of the front end of the winding body 50, and a knob 58 linked between the upper edge and the lower edge of the recess 50a is formed integrally with the winding body 50. Further, the knob 58 forwardly protrudes more than the front end of the winding body 50. In a lower side portion of the front end surface of the winding body 50, hooking recesses 59,59 to which a claw (not shown) being formed on the inner side surface of the retainer 6 to be described below is hooked are formed on both the left and right sides of the winding body.

In the outer circumferential surface of the winding body 50, a portion located closer to the front side than the flange 52 constitutes a clad retainer. The optical fiber cable of which the clad is not peeled-off is inserted into the clad retainer, and the clad is inserted and maintained between the protrusion piece 53 protruded from the flange 52 and the outer circumferential surface of the winding body 50, so that the clad of the optical fiber cable is fixed. Core wire of the optical fiber cable of which the clad is peeled-off is introduced to the winding body 50 (winding part) side between the flanges 51 and 52 through the interval between the flange 52 and the drawing wall 56a or 56b, the core wire is wound around the winding body 50, and the core wire of the optical fiber cable is drawn through a drawing groove 57 between the front portions of the drawing walls 56a and 56b to the outside of the winder 5. Such a winding working is performed while gripping the knob 58 formed on the front surface of the winding body 50 by hand. The outer circumferential surface of the winding body 50 has the radius of curvature larger than the permitted minimum radius of curvature in which the signal transmitting properties of the wound optical fiber cable (for example, the optical fiber cable made of glass fiber) does not deteriorate not to affect the signal transmitting properties of the wound optical fiber cable. Further, an inner circumferential surface of the corner of the drawing walls 56a and 56b which is located at both sides of the drawing groove 57 also is comprised of an R-curved surface having the radius of curvature larger than the permitted minimum radius of curvature of the wound optical fiber cable not to affect the signal transmission characteristics of the optical fiber cable drawn along the drawing walls 56*a* and 56*b*. The surfaces of the winding body 50, the flanges 51 and 52 and the drawing walls 56*a* and 56*b* are preferably made to a slidable surface by a soldering, glazing, etc., such that the clad or core wire of the wound optical fiber cable can be rotated thereon to decrease tensile force.

Further, as shown in FIGS. 1 and 2, the retainer 6 which receives the winder 5 and is detachably attached to the plug receptacle main body 1 is made of a synthetic-resin molded body, and comprises a housing 60 which is a hollow member whose lower opening is blocked by a bottom wall. The front and rear side walls 61*a* and 61*b* of the housing 60 is configured such that a semi-circular part protrudes from a bottom side of a rectangular shape horizontally extending, and side walls 61*a* and 61*b* are connected to each other by a peripheral wall 61*c* erected from peripheral edges except the top side. The space portion surrounded by the sidewalls 61*a* and 61*b* and the peripheral wall 61*c* serves as a receiving portion 62 for receiving the winder 5. A guide groove 63 having the nearly same width as that of the knob 58 of the winder 5 is formed on the front side wall 61*a* of the housing 60 in the vertical direction, this guide groove 63 is opened toward the top side, and the knob 58 forwardly protruding from the front surface of the winding body 50 is inserted into the guide groove 63, so that the winder 5 is inserted into the receiving portion 62 while being guided. Protruding die 64 protruding from the intermediate position in the left-right direction toward the front side is formed on the front surface side of the sidewall 61*a*. A hooking piece 64*a* which is hooked to the supporting groove 17*a* of the plug receptacle main body 1 protrudes from the both left and right sides of the lower front end of the protruding die 64 in side directions respectively, and a hooking protrusion 64*b* which is hooked to a hooking recess 17*b* formed concavely on the surface of the supporting groove 17*a* protrudes from the rear surface of each hooking piece 64*a*. Further, protruding pieces 65*a* and 65*b* protruding from both the left and right edges toward the front side are integrally formed on the upper front end of the protruding die 64, and both the protruding pieces 65*a* and 65*b* are formed up to the height of the drawing walls 56*a* and 56*b* formed in the winder 5 when the winder 5 is received in the receiving portion 62. Further, the section of both protruding piece 65*a* and 65*b* is formed in a circular arc shape such that, in the interval between both the protruding pieces 65*a* and 65*b*, the interval at the rear end is nearly equal to the width of the front end of the drawing groove 57, and the interval broadens out as it goes to the front side. The one (left) protruding piece 65*a* protrudes more than the other (right) protruding piece 65*b* up to the front side. On the opposing surfaces of both the protruding pieces 65*a* and 65*b*, a bottom wall 65*c* is formed to connect between the opposing surfaces of both the protruding pieces 65*a* and 65*b*. When the winder 5 is received in the receiving portion 62, the bottom wall 65*c* is continued to the bottom surface of the drawing groove 57 formed on the winder 5. A pressing piece 66 parallel with the bottom wall 65*c* extends from the front side portion of the top end of the one protruding piece 65*a*, and a hooking portion 66*a* downwardly protruding is formed integrally with the leading end of the pressing piece 66. The space surrounded by the protruding pieces 65*a* and 65*b* and the bottom wall 65*c* becomes the guiding groove 65.

Here, the interval of the peripheral wall 61*c* in the left-right direction is slightly larger than the outer diameter of the flange 51 of the winder 5, the retainer 6 is made to a small-sized unit, and the optical fiber cable wound on the receiving winder 5 is regulated not to increase more than necessary while the permitted minimum radius of curvature thereof being maintained when the winding diameter of the cable increases due to the outward elastic force. A stepped portion 61*d* which is coupled to the lower-side semicircle portion of the flange 51 formed in the winder 5 is formed on the inner side surface of the rear side wall 61*b* (refer to FIG. 6), the lower semicircle portion of the flange 51 contacts the stepped portion 61*d*, and the lower end of the knob 58 contacts the lower end of the guide groove 63, so that it is possible to secure a receiving space 67 for the core wire of the optical fiber cable between the winder 5 and the lower part of the receiving portion 62 when the winder 5 is received in the receiving portion 62. Therefore, even though the core wire wound on the winder 5 is expanded by outward elastic fore to generate the remaining portion, it is possible to prevent the remaining portion of the core wire from being outwardly forced out from the receiving portion 62 by pushing the remaining portion into the receiving space 67. As a result, it is possible to reliably protect the core wire of the optical fiber cable.

The decoration cover 7 is made of a synthetic-resin molded body in which a rectangular frame-shaped front portion 70 having a vertically elongated aperture 71 into which the front end portion of the plug receptacle main body 1 is inserted and a side portion 72 backwardly protruding from the peripheral edge of the front portion 70 are integrally formed. On the rear surface of the front portion 70, two elastic hooking pieces 73 which is hooked to the hooking recess 12*c* of the plug receptacle main body 1 are formed at each of the upper and the lower edges of the aperture 71. A plurality of protrusions 74 contacting the front end surface of side pieces 83 of the mounting frame 8 to be described bellow protrudes from each rear edge of the side portion 72 with a predetermined interval from each other.

The mounting frame 8 is formed in a shape of a rectangular frame in which mounting opening 81 with the same dimensions as that of a mounting frame for big square type interchangeable wiring device standardized in JIS etc. is formed at the center thereof. In each side piece 82 disposed oppositely from each other in the longitudinal direction, an elongated hole 84 into which a box screw for attaching the mounting frame 8 to a flush box (not shown) is inserted, attachment holes 85 to which inserting members (not shown) conventionally known are inserted for attaching the mounting frame 8 to a structural element of walls such as a gypsum board, and a tapped hole 86 for plate screw for attaching a plate frame (not shown) etc. to the front surface are at least formed. Further, contact pieces 87,87 forwardly protruding to contact the upper and lower side walls 11*b* and 11*c* of the plug receptacle main body 1 are formed at side edges of the side pieces 82,82 which face the mounting opening 81. On the other hand, each side piece 83,83 opposing each other in the width direction of the mounting frame 8 is bent at a nearly right angle toward the rear side, and front ends portions of the side pieces 83,83 are outwardly bent in the left-right direction at a nearly right angle. Further, on the rear edges of the sidepieces 83,83, two hooking frame pieces 88 having a 'U' shape which are hooked to the hooking protrusions 12*a* of the plug receptacle main body 1 are integrally formed at each of the upper and lower sides.

Hereinafter, a method of assembling the wiring device for optical fiber according to the present invention will be described in detail.

First, in the receiving portion surrounded by the front part 20 and the side parts 21,21 of the cover 2, the receptacle is inserted after the direction of the housing 30 is aligned to contact the front surface of the housing 30 with the ribs 23 protruding from the rear surface of the front part 20. At this time, the step portions 23a of the ribs 23 contact the stepped portion of the housing 30, and the ribs 23b extending toward the rear side from the lower-side portion of the ribs 23 contact the front surface of the lower-side portion of the housing 30, so that the housing 30 is located in the cover 2. At this state, the contact piece 40 of the pressing plate 4 is contacted to the upper rear surface of the housing 30, and the contact pieces 42a is contacted to the lower rear surface of the housing 30. Then, the screw 24 passed through the penetrated hole 21b of the leg piece 21c is inserted into the tapped hole 43 formed in the supporting piece 41 of the pressing plate 4 to fix the pressing plate 4 to the cover 2, so that the receptacle 3 is placed between the pressing plate 4 and the cover 2. At this time, since the leading ends of the supporting pieces 41 of the pressing plate 4 are located at the rear-side portion than the portion from which the engagement claws 21a of the leg pieces 21c protrude, the force inwardly pressing the side parts can be received by the supporting pieces 41 of the pressing piece 4 made of metal material.

Next, at the time of combining the plug receptacle main body 1 with the cover 2, the center piece of the center portion 9a of the spring member 9 is hooked to the lower portion of the bearing portion 13 of the plug receptacle main body 1, and both twisted portion 9b, 9b of the spring member 9 is inserted into the recess (not shown) formed on both ends of the bearing portion recess 13a to communicate both end of the bearing portion recess 13a with opened holes of the twisted portions 9b, 9b. Next, the cover 2 is disposed at the front side of the plug receptacle main body 1 so as to interpose the bearing portion 13 between the shaft supporting portions 22,22 of the cover 2, and the rotation shaft 10 is inserted into the shaft hole 11e formed in the one side wall 11a, the shaft hole 22a of the one shaft supporting portion 22, the opened hole of the one twisted portion 9b, the bearing recess 13a of the bearing portion 13, the opened hole of the other twisted portion 9b, the shaft hole 22a of the other shaft supporting portion 22 and the shaft hole lie of the other side wall 11a in this order. Here, in the rotation shaft 10, the diameter thereof from the one end of the inserting side to the portion near to the other end is slightly smaller than the inner diameter of the shaft holes 11e and 22a and the bearing recess 13a, so that the rotation shaft 10 can be inserted. However, the diameter of the other end 10a is larger than the inner diameter of the shaft hole lie and a knurling treatment is performed on the outer surface of the rotation shaft 10. Therefore, when the other end 10a is finally pressed into the shaft hole lie, the rotation shaft 10 is fixed to the plug receptacle main body 1. At this time, each extension part 9c, 9c extending from the twisted portions 9b, 9b of the spring member 9 elastically contacts the rear surface of the front part 20 of cover 2, so that biasing force for rotating the cover 2 from the front part of the plug receptacle main body 1 in the forwardly projecting direction is applied to the cover 2. Specifically, the upper end portion of the cover 2 is rotatably pivoted to the plug receptacle main body 1 about the rotation shaft 10, and biasing force for rotating the lower end portion of the cover 2 from the front part of the plug receptacle main body 1 in the forwardly projecting direction about the rotation shaft 10 is applied to the cover 2 by the spring member 9.

As described above, the receptacle is mounted on the cover and the cover 2 is attached to the plug receptacle main body 1 to complete the assembling of the wiring device for optical fiber. FIGS. 3A to 3C, 4B and 6 illustrate a state in which the cover 2 is rotated to the front part of the plug receptacle main body 1 against the biasing force of the spring member 9, and the leading end of the hooking protrusion piece 25 formed at the lower end portion of the cover 2 is hooked to the hooking hole 15d by elastic force of the flexible piece 15. At this time, the front surface of the front part of the cover 2 is nearly flush with the front surface of the plug receptacle main body 1, the receptacle 3 attached to the rear surface of the front part 20 is received in the plug receptacle main body 1 in a received state (this state is a non-used state). At this time, the inclined surfaces of the rear edges of the side parts 21,21 contact the front-end surfaces of the ribs 16a, 16a protruded on the inner surfaces of the sidewalls 11a, 11a of the plug receptacle main body 1, so that the backward movement of the cover 2 is restricted.

Figure 6:
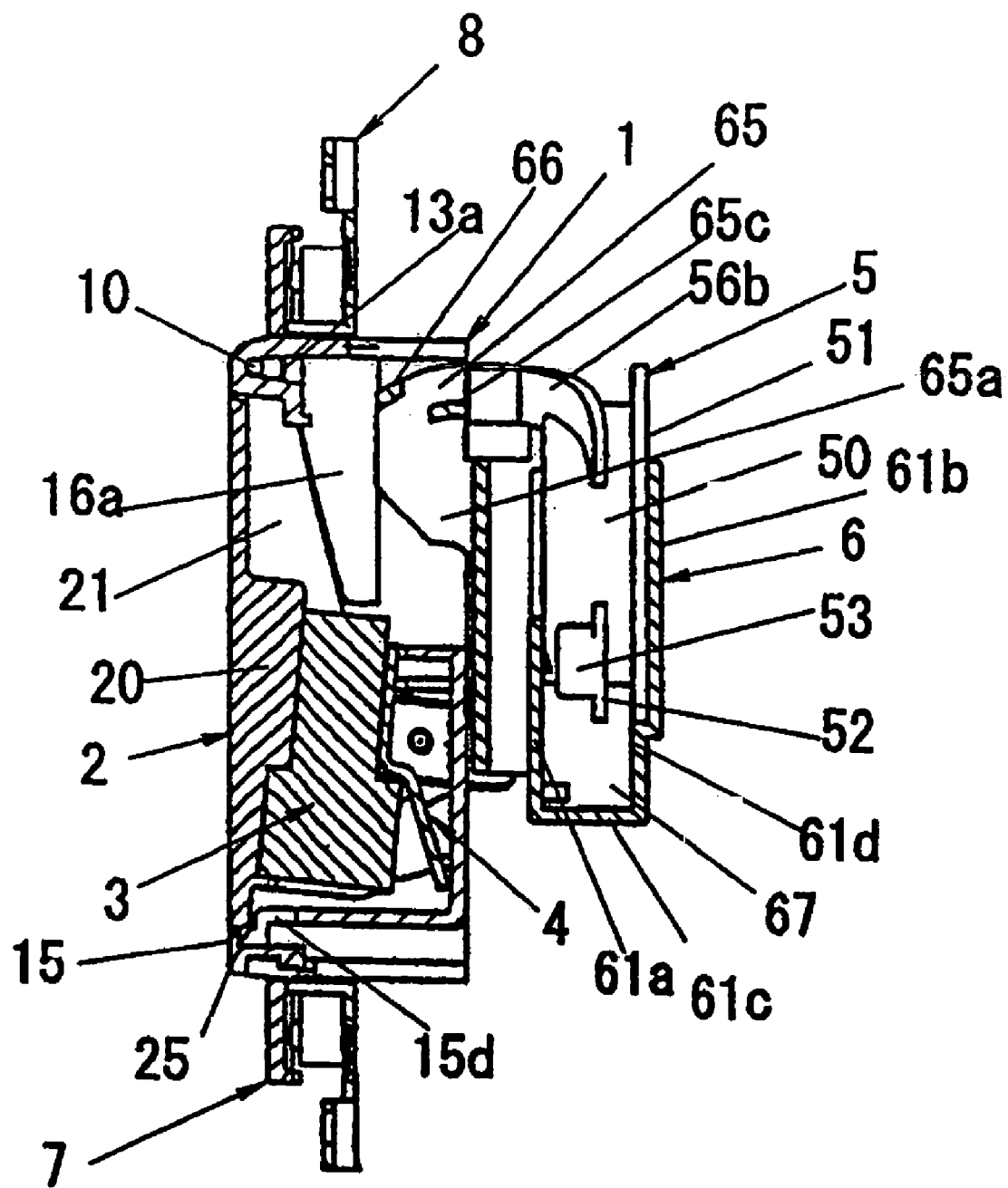
FIG. 6 is a sectional view taken along a line A—A of FIG. 3A illustrating wiring device for optical fiber according to an embodiment of the present invention.
Figure 7:
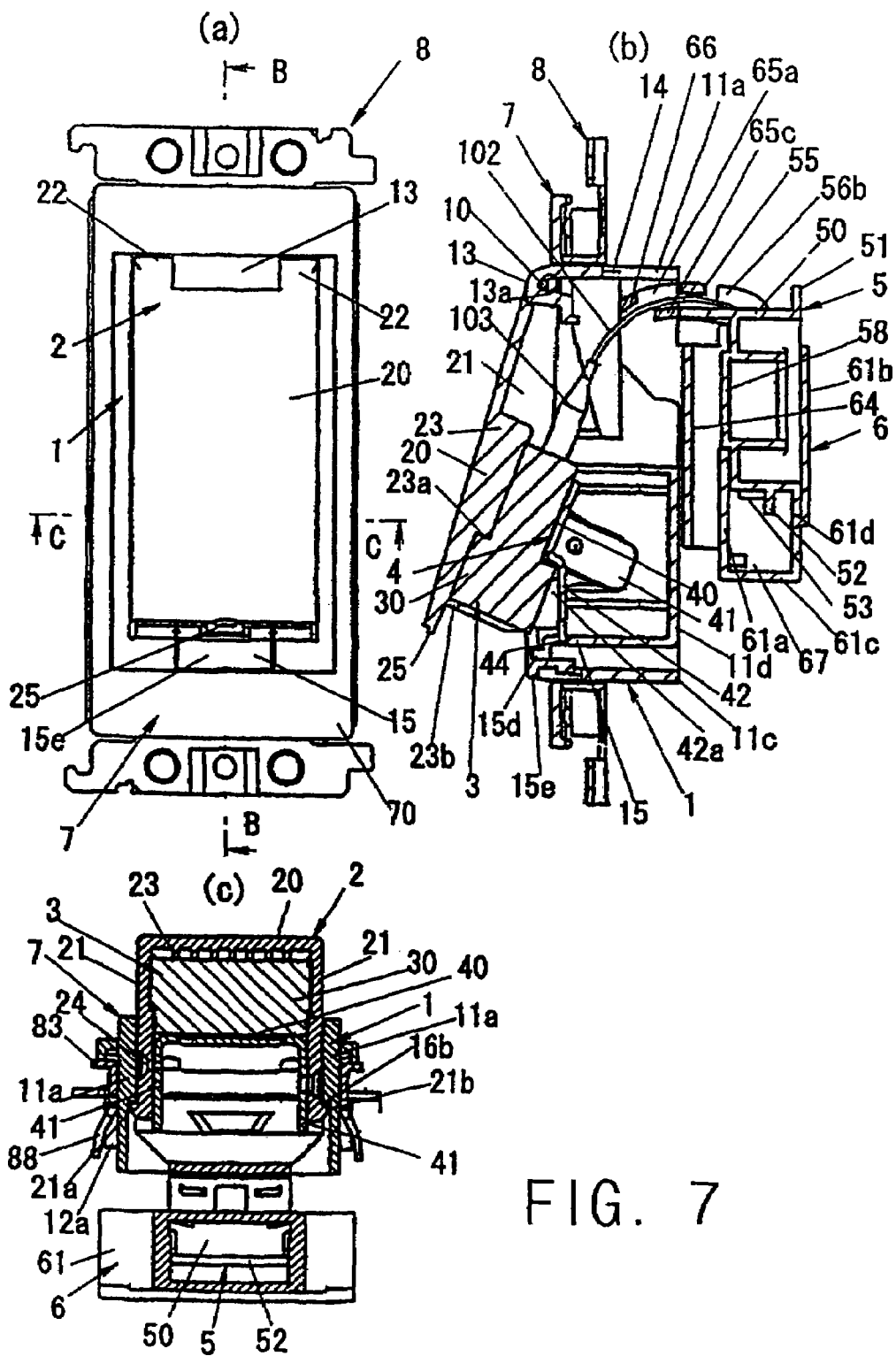
Figure 8:
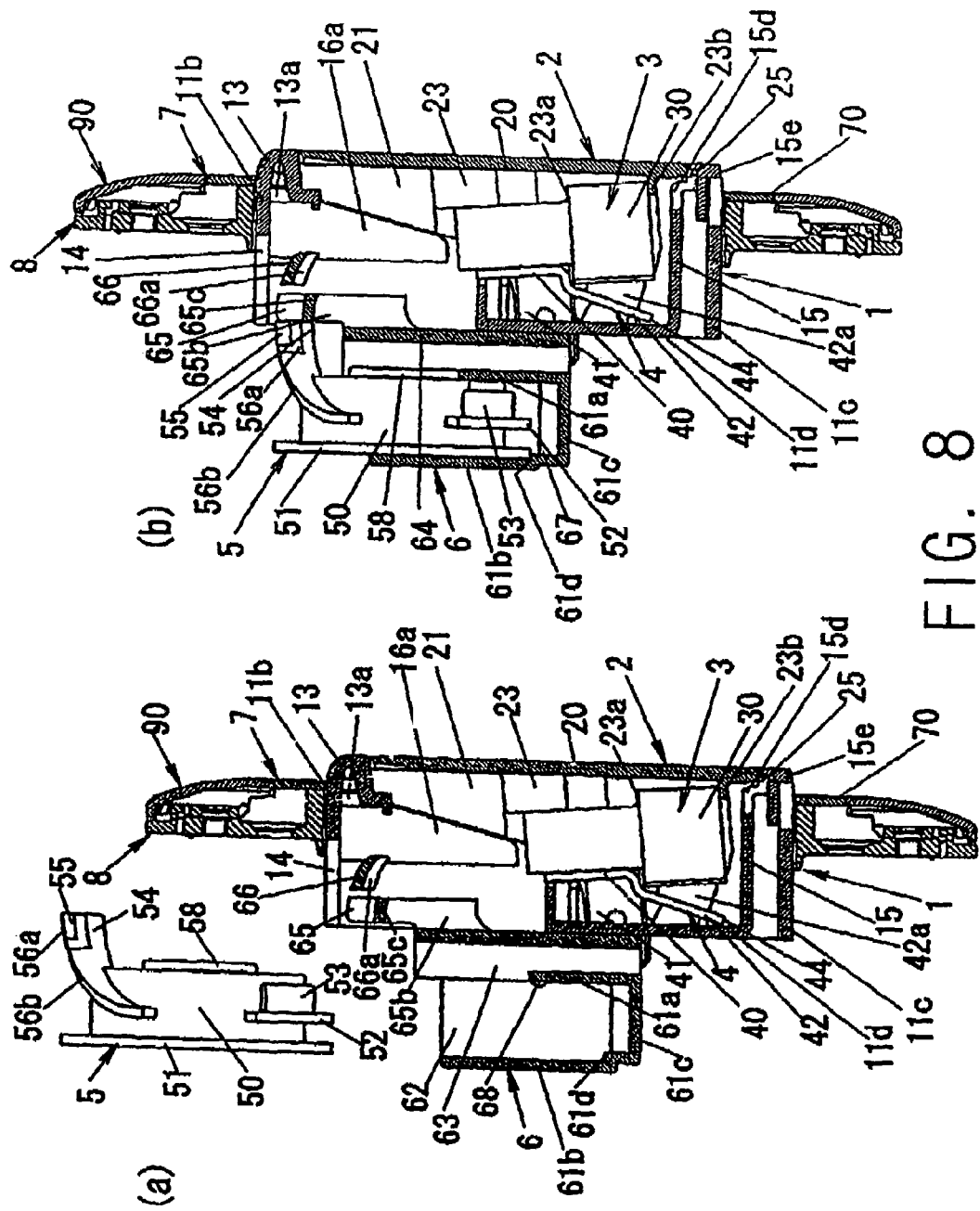
Figure 9:
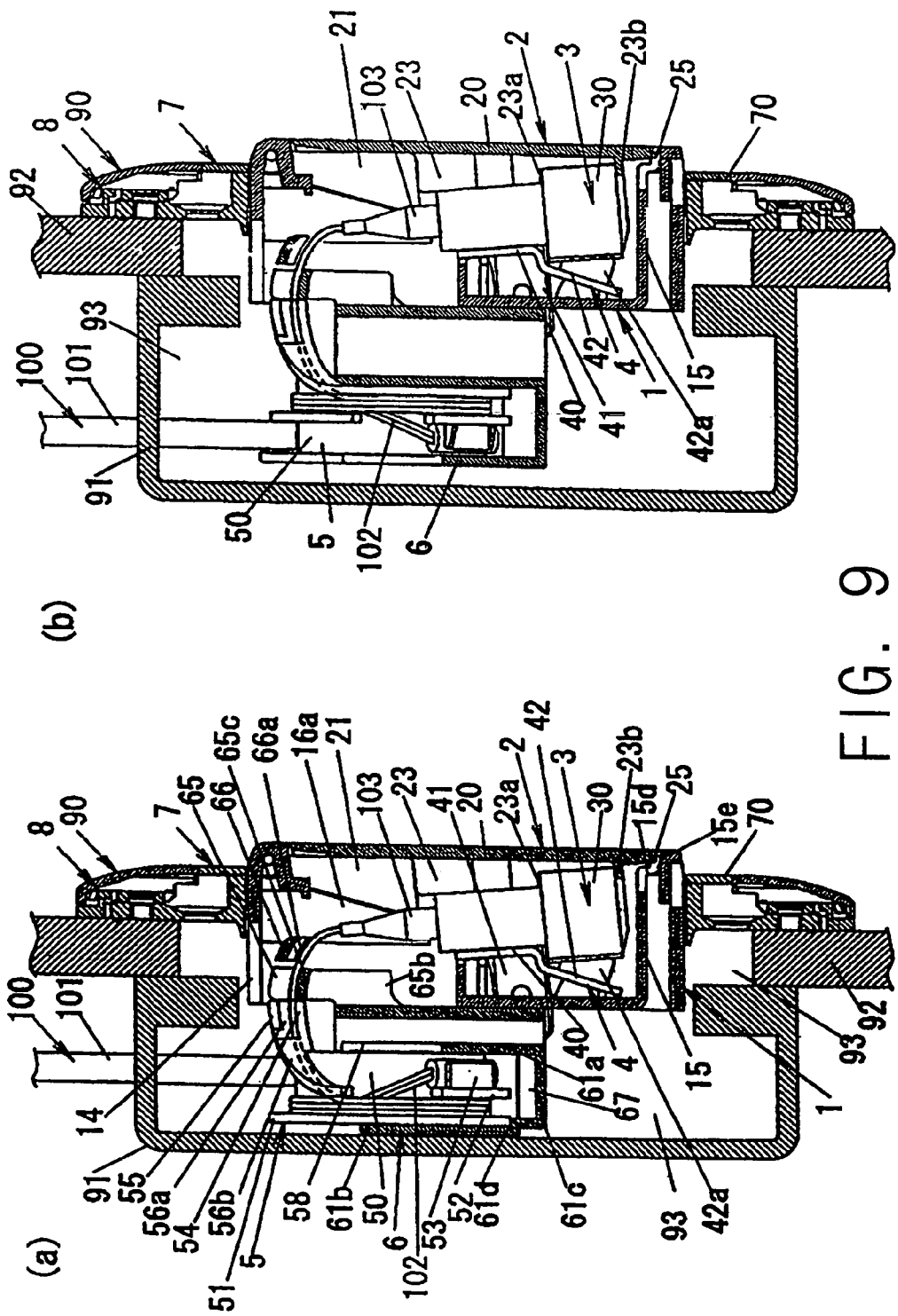
Figure 10:
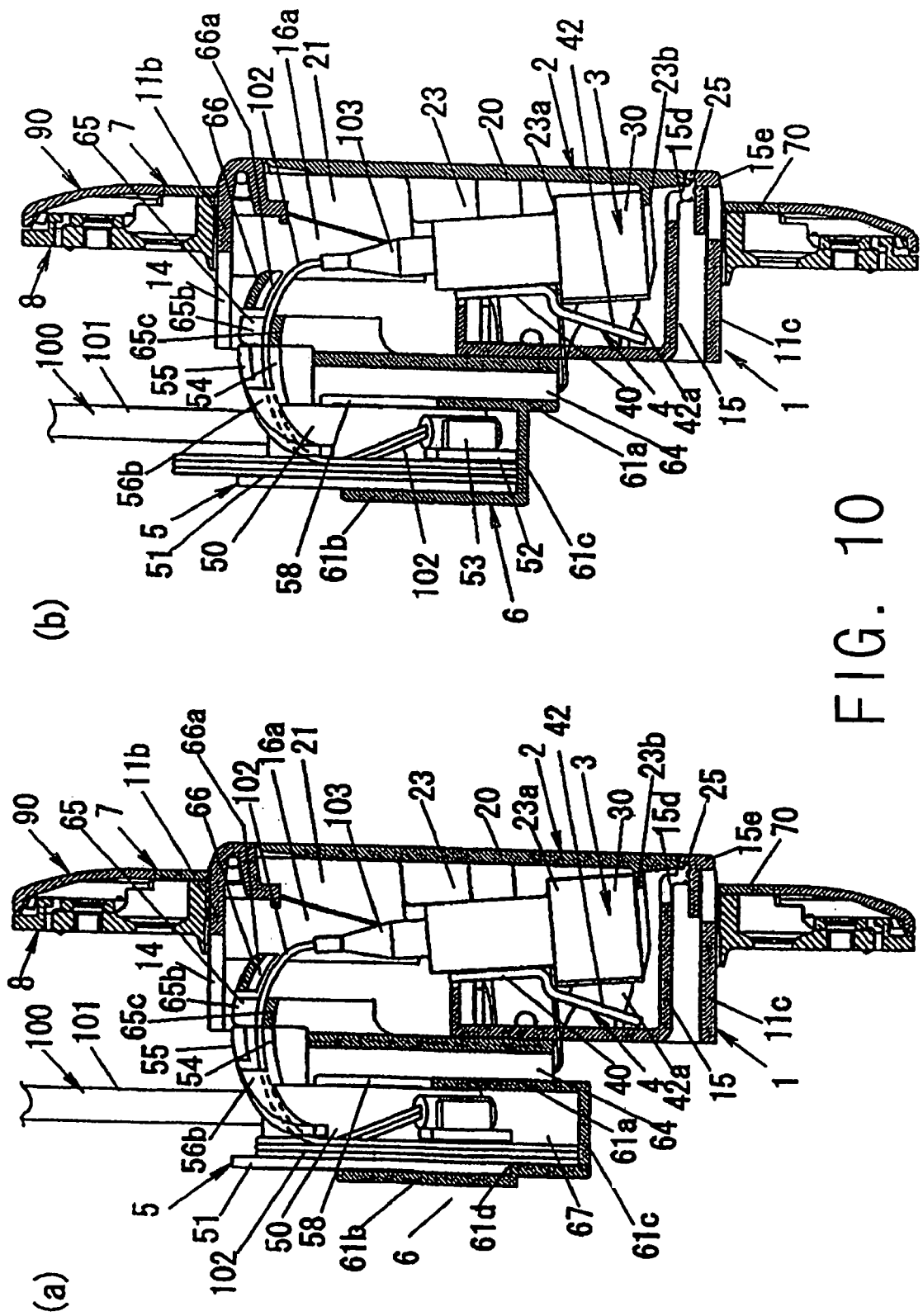

At this non-used state, when an operating portion 15e of the flexible piece 15 exposed toward the front side of the plug receptacle main body 1 is pressed down, the front portion of the flexible piece 15 is downwardly bent, and the leading end of the hooking protrusion piece 25 is detached from the hooking hole 15d, so that biasing force of the spring member 9 is applied to the cover 2 to rotate about the rotation shaft 10 in a clockwise direction in FIG. 6. When the lower end of the cover 2 is forwardly rotated, each engagement claw 21a formed on both leg piece 21c of the cover 2 is hooked to the rear end portion of the ribs 16b formed on inner side surfaces of the left and right side walls 11a of the plug receptacle main body 1, so that the forward rotation of the cover 2 is regulated and the cover 2 is forwardly projected from the front part of the plug receptacle main body 1 such that the front part 20 is downwardly inclined, the plug connection hole of the receptacle 3 downwardly faces the outside between the lower end portion of the front part 20 and the front side of the plug receptacle main body 1. This projected state is a use state in which the plug connection is performed. At this state, the hooking protrusion piece 44 of the pressing plate 4 mounted on the cover 2 is hooked into the hooking hole 15d of the flexible piece 15, and the hooking protrusion piece 44 is hooked to the rear edge of the hooking hole 15d, so that the backward rotation of the cover 2 is restricted and the cover 2 is maintained at a state in which the cover is forwardly projected (refer to FIGS. 7A to 7C).

Figure 5:
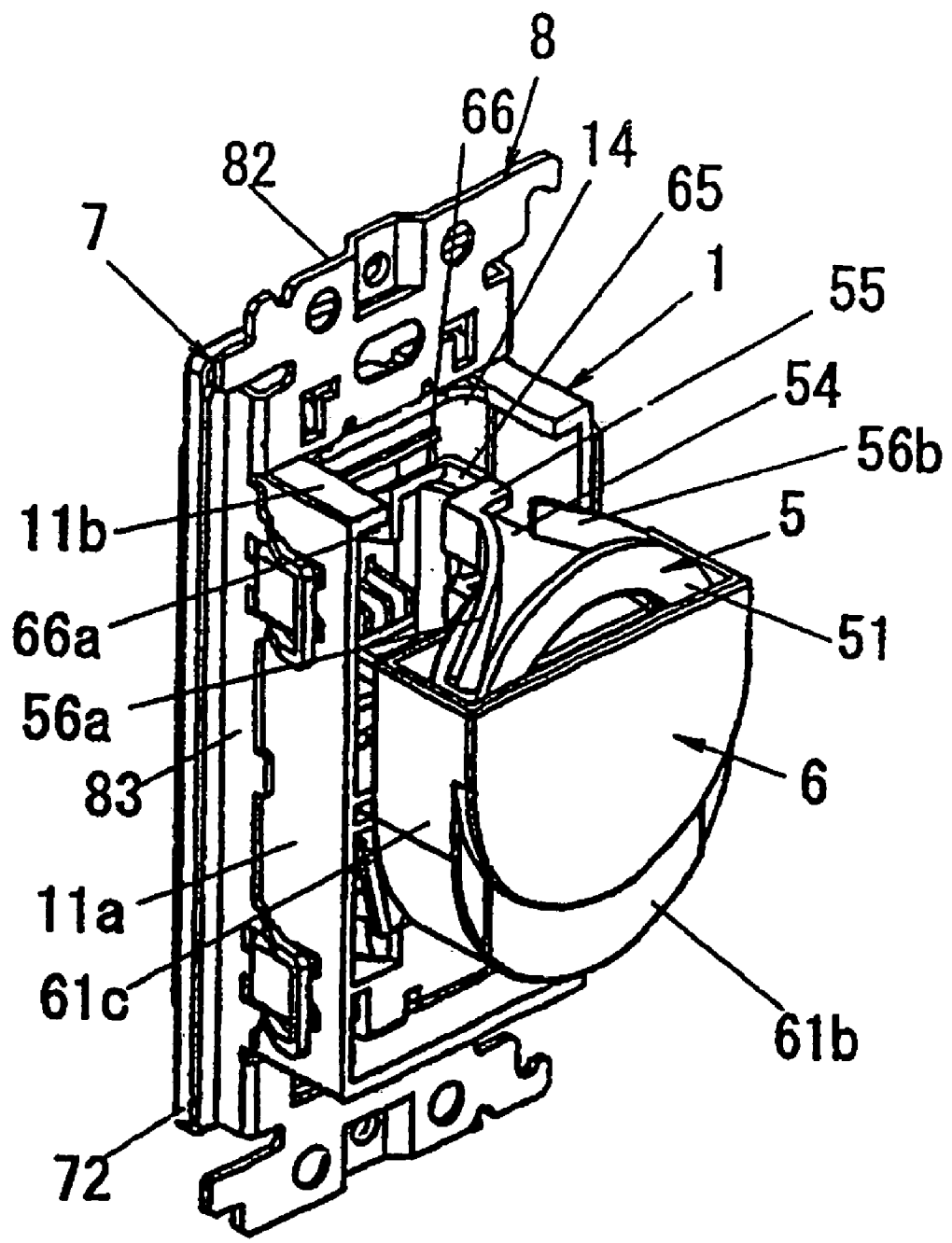
FIG. 5 is an external perspective view illustrating the wiring device for optical fiber according to an embodiment of the present invention as seen from a rear side.

Further, from the used state described above, when an operating portion 15e of the flexible piece 15 is pressed down to downwardly bend the front side portion of the flexible piece 15, the leading end of the hooking protrusion piece 44 formed in the pressing plate 4 is detached from the hooking hole 15d. At the state in which the engagement between the hooking protrusion piece 44 and the hooking hole 15d is released, when the lower-side portion of the cover 2 is backwardly pressed (pressed to the front part of the plug receptacle main body 1) against the biasing force of the spring member 9 and the cover 2 is rotated about the rotation shaft 10 in a counter clockwise direction in FIG. 7B, the rear end edgy of the side parts 21,21 of the cover 2 contact the front end of the ribs 16a formed on the side walls 11a of the plug receptacle main body 1. Therefore, the backward rotation of the cover 2 is regulated. Further, the front end of the hooking protrusion piece 25 formed at the lower end of the cover 2 is hooked into the hooking hole 15d by the elastic force of the flexible piece 15, so that the front surface of the front part 20 of the cover 2 is nearly flush with the front surface of the plug receptacle main body 1, and the receptacle 3 attached to the rear side of the front part 20 is received in the plug receptacle main body 1. Here, the spring member 9 and the flexible piece 15 having the operating portion 15e constitute a pop-up mechanism for popping-up the cover 2 and the receptacle 3. FIGS. 4A and 4B are external perspective views of the wiring device for optical fiber at the used state and at the non-used state, respectively. FIG. 5 is an external perspective view of the wiring device for optical fiber as seen form the rear side.

Hereinafter, a construction method of mounting the wiring device for optical fiber according to the present embodiment on a mounting hole 93 of a flush box 91 buried in the wall 92 such as a wall panel or a concrete wall which is opened in the outer surface of a building as shown in FIG. 9A will be described.

First, the front part of the plug receptacle main body 1 is inserted into the mounting opening 81 of the mounting frame 8 from the rear side, the two hooking frame pieces 88 protruding from each of the rear edges of the side pieces 83,83 of the mounting frame 8 are inserted into the hooking protrusions 12a formed on outer side surfaces of the side walls 11a, 11a of the plug receptacle main body 1, and the rear-side piece of the hooking frame piece 88 is elastically deformed to be hooked at the recess 12b formed at the rear edge of the hooking protrusion 12a, thereby the plug receptacle main body 1 is fixed to the mounting frame 8.

Next, as shown in FIG. 9A, the first plug 103 for optical fiber attached at the leading end of the core wire 102 being exposed by peeling off the clad 101 of the optical fiber cable 100 is introduced into the plug receptacle main body 1 through the notch 14 formed at the upper side wall 11b of the plug receptacle main body 1. Here, the optical fiber cable 100 is wired to the inside of a building (in case of the wall panel, in the wall at the rear side of the wall panel, and in case of the concrete wall, in the concrete wall) and is introduced into the flush box buried in the wall. Then, the first plug 103 is inserted into the opened first plug connection portion of the receptacle, which is maintained by the cover 2 and is connected to the receptacle 3.

As described above, after the first plug 103 for optical fiber is connected to the receptacle 3, the retainer 6 is attached to the rear part lid of the plug receptacle main body 1, and the core wire 102 of optical fiber attached to the first plug 103 for optical fiber is inserted into a guide groove 65 through the lower part of the pressing piece 66 of the retainer 6 and is backwardly drawn from the rear end of the guide groove 65. In the attachment of the retainer 6, each hooking pieces 64a formed on the front surface of the retainer 6 is hooked to each of supporting grooves 17a of the supporting portions 17 integrally formed on the rear left and right sides of the rear part 11d from the lower ends of the supporting grooves 17a, and the hooking protrusion 64b formed on the rear surface of the hooking piece 64a is hooked to the hooking recesses 17b formed on opposing surfaces in the supporting grooves 17a, so that the hooked state of the hooking pieces 64a is maintained and the retainer 6 is attached to the rear part lid of the plug receptacle main body 1.

In the winding process of winding the optical fiber cable 100 backwardly drawn from the guide groove 65 of the retainer 6 to the winder 5, leading end (end portion of peeled out clad) of the clad 101 of the optical fiber cable 100 is maintained between the outer circumferential surface of the winding body 50 and the protruding pieces 53,53 (the clad maintaining portion), the core wire 102 of the optical fiber is introduced to the winding part between the flange 51 and the flange 52 through an interval between the protruding piece 53 and the drawing wall 56a or 56b, and the core wire 102 of the optical fiber is wound on the winding part. This winding process is performed with the knob 58 formed on the front surface of the winding body 50 is being gripped by hand. Thus, it is possible to easily perform the winding work.

When the remaining length of the core wire 102 of the optical fiber is short, after core wire 102 of the optical fiber is drawn from the interval between the protruding piece 54 and the pressing piece 55 to the outside through the drawing groove 57, the winder 5 is inserted into the receiving portion 62 of the retainer 6 and is maintained in the retainer 6 as shown in FIGS. 8A and 8B. Further, when the winder 5 is inserted, the knob 58 is guided by interlocking with the guide groove 63 formed in the side wall 61a of the retainer 6, so that the winder 5 can be easily inserted in the retainer 6, and the winder 5 can be received and maintained in the receiving portion 62 in the normal direction. Further, the winder 5 is received and maintained in the normal direction, so that the front end of the drawing groove 57 and the rear end of the guide groove 65 of the retainer 6 are communicated with each other, thereby the drawing groove 57 and the guide groove 65 constitute a guide path guiding the core wire 102 of the optical fiber. Further, when the winder 5 is inserted until the lower edge of the winding body 50 in the receiving portion 62 contacts the stepped portion 61d of the inner surface of the side wall 61b, the hooking recess 59 formed on the front end surface of the winding body 50 is hooked to a hooking protrusion 68 formed on the side wall 61a, so that the winder 5 is prevented from being pulled out. Further, when the hooking protrusion of the sidewall 61a is hooked to the hooking recess 59, the hooking process is easily performed by the elasticity of the sidewall 61a and the tapered surface formed at the lower side of the hooking recess 59.

Further, after the winder 5 is maintained in the retainer 6 attached to the plug receptacle main body 1, the retainer 6, the rear part of the plug receptacle main body 1, and the remaining portion of the clad 101 of the optical fiber cable 100 is received in the flush box 91 (refer to FIG. 9A), and an attaching screw (not shown) are fixed to tapped holes (not shown) of the flush box using elongated holes 84 formed in the upper and lower side pieces 82 of the mounting frame 8. Then, the elastic hooking pieces 73 of the decoration cover 7 are hooked to the hooking recesses 12c of the plug receptacle main body 1 to attach the decoration cover 7 to the front surface side of the plug receptacle main body 1, then a decoration plate 90 is attached to the front surface side of the mounting frame 8 by an engagement claw (not shown) or a screw. By this decoration plate 90, the attaching holes and the mounting frame 8 are covered, and front portions of the plug receptacle main body 1 and decoration cover 7 are outwardly exposed from an aperture of the decoration cover 90, thereby the construction is finished.

At this construction state, to make the receiving space of the wiring device for optical fiber as small as possible, the receptacle 3 and the winder 5 are arranged in parallel with each other with the drawing directions of the optical-fiber core wire 102 upward, and the optical-fiber core wire 102 is curved so as to be convex upwardly between the receptacle 3 and the winder 5. Here, the optical-fiber core wire attached to the optical-fiber plug 103 is introduced to the winding part of the winder 5 through the guide groove 65 of the retainer 6 and the drawing groove 57 of the winder 5. However since pressing pieces 66 and 55 pressing the bent portion of the optical-fiber core wire 102 from the upper side are disposed at the retainer 5 and the winder 6, respectively, so that it is possible to prevent the bent portion of the optical-fiber core wire 102 from expanding toward the upper side (in the direction away from the receptacle 3 and the winder 5). Further, the remaining length portion of the optical-fiber core wire 102 is disposed at the lower position than the pressing pieces 55 and 66, so that it is possible to reliably maintain the optical-fiber core wire 102. In the present embodiment, as the expansion-preventing portion, the pressing pieces 55 and 66 are disposed at the retainer 6 and the winder 5, respectively. However, the pressing piece may be disposed at either the retainer 6 or the winder 5.

Further, as described above, the receptacle 3 and the winder 5 are arranged in parallel with each other in front-back direction, and the optical-fiber core wire 102 is bent in an inverted-'U' shape therebetween. However, since it is need to make the radius of curvature of the core wire 102 larger than the permitted minimum radius of curvature so as not to damage the signal transmitting characteristics of the optical fiber cable, it is difficult to make the interval between the optical fiber plug 103 and the winding part (the portion between flange 51 and 52) shorter than the length determined on the basis of the permitted minimum radius of curvature. As a result, in the winding body 50 of the winder 5, when the clad retainer maintaining the clad 101 is disposed at the rear side than the winding part on which the optical core wire 102 is wound, as shown in FIG. 9B, the length from the front surface of the plug receptacle main body to the rear surface of the winder 5 was prolonged, and only a standard box deep in depth could be used as the flush box 91. Contrary to this, in the winding body 50 of the winder 50 according to the present embodiment, since the clad retainer is disposed at the front side (the receptacle 3 side) than the winding part, and the clad retainer is disposed using an empty space between the receptacle 3 and the winding part, it is possible to shorten the length between the front surface of the plug receptacle main body 1 and the rear surface of the winder 5. As a result, a box shallow in depth can be used as the flush box 91.

Further, in the constructed state, the winding diameter of the optical-fiber core wire 102 wound on the winder 5 received in the receiving portion 62 is widen due to the outward elastic force, and an interval can be generated between the wound optical-fiber core wire 102 and the winding body 50. However, as shown in FIG. 10B, at a state in which the winder 5 is received in the receiving portion 62 of the retainer 6, when an empty space between the winding body 50 of the winder 5 and the lower portion of the receiving portion 62 does not exist, the optical-fiber core wire 102 is forced out from the receiving portion 62 to the upper side by the expanded portion. As a result, the remaining length portion of the optical-fiber core wire 102 forced out to the upper side may contact a foreign body in the flush box. Contrary to this, in the present embodiment, the lower-side semicircle portion of the flange 51 provided to the winder 5 is connected to the stepped portion 61*d* formed at inner side surface of the side wall 61*b* of the retainer 6 as well as the lower end of the knob 58 contact the lower end of the guide groove 63, so that the winder 5 is received the receiving portion 62 while securing the receiving space between the winding body 50 and the lower part of the receiving portion 62. Therefore, it is possible to prevent the remaining portion from being forced out to the outside of the receiving portion 62 by pushing the remaining portion of the optical-fiber core wire into the receiving space 67. As a result, it is possible to reliably protect the optical-fiber core wire 102.

According to the first aspect of the invention, since an optical fiber cable is wound on a winder with a radius of curvature larger than the permitted minimum radius of curvature, it is possible to easily manage a remaining portion of a core wire by only winding the core wire of the optical fiber cable on the winder without deteriorating a signal transmitting characteristic. Further, at a state in which the winder is maintained in a retainer, since an expansion preventing unit contacts a bent portion of the core wire, the bent portion of the optical-fiber core wire is prevented from expanding in the direction away from the receptacle and the winder, so that it is possible to reliably maintain the core wire of the optical fiber cable.

To make the receiving space of the wiring device for optical fiber small, the receptacle for optical fiber and the winder are arranged in parallel with each other in the front-back direction, and the core wire of the optical fiber cable is bent between the receptacle for optical fiber and the winder. However, it is need to make the radius of curvature of the core wire larger than the permitted minimum radius of curvature so as not deteriorate a signal transmitting properties of the optical fiber cable. By this fact, it is need that the interval of the receptacle for optical fiber and the winder in the front-back direction is larger than the interval determined by the permitted minimum radius of curvature. According to the second aspect of the invention, in the winder, since a clad maintaining part maintaining the clad of the optical fiber is arranged at a portion of the receptacle for optical fiber side, and the winder for winding the core wire is arranged at a portion opposite from the receptacle for optical fiber, the clad retainer is disposed using a space between the receptacle for optical fiber and the winder. Therefore, it is possible to shorten the distance between the front surface of the plug receptacle main body and the rear surface of the winder. Thus, it is possible to receive the winder at a space shallow in depth.

According to the third aspect of the invention, the winder is provided with a knob, so that it is possible to wind the core wire on the winder with gripping the knob, which enhances the performance of winding work. Further, since a guide groove guiding the winder in connection with the knob is formed on an inner surface of the receiving portion, guiding the knob in the guiding groove, which also enhances the workability, can easily perform the receiving process of receiving the winder in the receiving portion of the retainer.

According to the fourth aspect of the invention, since a receiving space for the core wire of the optical fiber cable is formed between a bottom surface of the receiving portion disposed at the retainer and the winder, even though the core wire wound on the winder is expanded by outward elastic fore to generate the remaining portion, it is possible to prevent the remaining portion of the core wire from being forced outwardly from the receiving space by pushing the remaining portion into the receiving space. As a result, it is possible to reliably protect the core wire of the optical fiber cable.

Although the exemplary embodiments of the present invention have been described, the present invention is not limited to the above exemplary embodiments, but may be modified in various forms without departing from the scope of the appended claims, the detailed description, and the accompanying drawings of the present invention. Therefore, it is natural that such modifications belong to the scope of the present invention.

The present disclosure relates to subject matter contained in Japanese Application No. 2004-045298, filed on Feb. 20, 2004, the contents of which are herein expressly incorporated by reference in its entirety.

What is claimed is:

1. Wiring device for optical fiber, the wiring device comprising:
   an optical plug receptacle including a plug receptacle main body which is mounted on a mounting opening opened in the outer surface of a building and a receptacle for optical fiber which is provided to the plug receptacle main body and has a plug connection hole facing the outside of the plug receptacle main body;
   a winder which fixes an optical fiber cable wired to the inside of a building and connected to the receptacle for optical fiber and on which the optical fiber cable is wound at a radius of curvature larger than the permitted minimum radius of curvature; and
   a retainer being provided on the plug receptacle main body to retain the winder in the inner side of the building,
   wherein the receptacle for optical fiber and the winder are arranged in parallel with each other in the front-back direction so that the core wire of the optical fiber cable is bent between the receptacle for optical fiber and the winder, are provided with expansion-preventing portions being in contact with the bent portion of the core wires so as to prevent that the bent portion is expanded in a direction away from the receptacle for optical fiber and the winder.

2. The wiring device for optical fiber of claim 1, wherein the winder includes a clad retaining portion for retaining a clad portion of the optical fiber cable, which the clad retaining portion is provided at a part of the winder on the receptacle's side, and a winding portion for winding cores of the optical fiber cable, which the winding portion is provided at a part of the winder opposite from the receptacle with respect to the clad retaining portion.

3. The wiring device for optical fiber of claim 1, wherein the winder is provided with a knob, and the retainer includes a receiving portion and a guiding portion, which the receiving portion is formed of the shape of substantially a box which one side is opened so as to receive the winder being inserted from the one side to the inside thereof, and which the guiding portion is formed on the inner surface of the receiving portion to guide the winder in combination with the knob at the time of receiving the winder.

4. The wiring device for optical fiber of claim 1, wherein the retainer includes a receiving portion and a receiving space, which the receiving portion is formed of the shape of substantially a box which one side is opened so as to receive the winder being inserted from the one side of the box to the inside thereof, and which the receiving space is formed between the bottom surface opposite from the one side of the box and the winder so as to receive the core wire of the optical fiber cable.

5. The wiring device for optical fiber of claim 2, wherein the winder is provided with a knob, and the retainer includes a receiving portion and a guiding portion, which the receiving portion is formed of the shape of substantially a box which one side is opened so as to receive the winder being inserted from the one side to the inside thereof, and which the guiding portion is formed on the inner surface of the receiving portion to guide the winder in combination with the knob at the time of receiving the winder.

6. The wiring device for optical fiber of claim 2, wherein the retainer includes a receiving portion and a receiving space, which the receiving portion is formed of the shape of substantially a box which one side is opened so as to receive the winder being inserted from the one side of the box to the inside thereof, and which the receiving space is formed between the bottom surface opposite from the one side of the box and the winder so as to receive the core wire of the optical fiber cable.

* * * * *